US011673261B2

(12) United States Patent
Jeremiah

(10) Patent No.: US 11,673,261 B2
(45) Date of Patent: Jun. 13, 2023

(54) ROBOTIC MANIPULATOR

(71) Applicant: INTELLIGRATED HEADQUARTERS, LLC, Mason, OH (US)

(72) Inventor: Grant R. Jeremiah, Steeleville, IL (US)

(73) Assignee: Intelligrated Headquarters, LLC, Mason, OH (US)

( * ) Notice: Subject to any disclaimer, the term of this patent is extended or adjusted under 35 U.S.C. 154(b) by 405 days.

(21) Appl. No.: 16/853,214

(22) Filed: Apr. 20, 2020

(65) Prior Publication Data

US 2021/0323144 A1 Oct. 21, 2021

(51) Int. Cl.
| B25J 9/00 | (2006.01) |
| B25J 9/12 | (2006.01) |
| B25J 15/06 | (2006.01) |
| B25J 9/10 | (2006.01) |
| B25J 9/16 | (2006.01) |
| B25J 15/02 | (2006.01) |
| B25J 5/02 | (2006.01) |

(52) U.S. Cl.
CPC ............... *B25J 9/123* (2013.01); *B25J 5/02* (2013.01); *B25J 9/0018* (2013.01); *B25J 9/1035* (2013.01); *B25J 9/1679* (2013.01); *B25J 15/02* (2013.01); *B25J 15/0608* (2013.01); *B25J 15/0616* (2013.01)

(58) Field of Classification Search
CPC ....... B25J 9/12; B25J 15/06; B25J 5/02; B25J 9/10; B25J 9/16
See application file for complete search history.

(56) References Cited

U.S. PATENT DOCUMENTS

| 6,435,397 | B2 * | 8/2002 | Angel ................. B23P 19/001 228/49.1 |
| 2006/0128281 | A1 * | 6/2006 | Bando .................... C03B 33/10 451/70 |
| 2008/0191119 | A1 | 8/2008 | Coma | |
| 2009/0024142 | A1 * | 1/2009 | Ruiz Morales ........ A61B 34/30 606/130 |
| 2017/0248936 | A1 * | 8/2017 | Hoshino ................ B25J 9/1676 |
| 2018/0267690 | A1 * | 9/2018 | Kemp ..................... B25J 5/007 |

FOREIGN PATENT DOCUMENTS

CN 109202871 A 1/2019

* cited by examiner

*Primary Examiner* — Kira Nguyen
(74) *Attorney, Agent, or Firm* — Alston & Bird LLP

(57) ABSTRACT

A manipulator including a shaft driven by a first motor, a rotatable unit, a linear slider, and a gripper is provided. The rotatable unit is coupled to the shaft, wherein the rotatable unit rotates with rotation of the shaft. The linear slider disposed on a first surface of the rotatable unit configured to slide from an initial position proximate to an outer edge of the rotatable unit to intermediate positions and to a final position proximate to a center of the rotatable unit. The gripper coupled to the linear slider to facilitate movement of the gripper along a first plane defined by the first surface of the rotatable unit.

20 Claims, 7 Drawing Sheets

ROBOTIC MANIPULATOR

TECHNOLOGICAL FIELD

Example embodiments of the present invention relates generally to a material handling system for handling items, and, more particularly, to robotic manipulators used in the material handling system for manipulating one or more items in a material handling environment.

BACKGROUND

Material handling systems can convey, sort, and organize items (e.g. cartons, cases, containers, shipment boxes, totes, packages, and/or the like) in a warehouse or a distribution center. Depending on a configuration of the material handling systems, the items may travel through the material handling systems in an unregulated manner, or may be repositioned, reoriented, and/or consolidated into a single stream of items on conveyors and/or other locations. Robotic manipulators may be a part of the material handling systems which can be used alone or in conjunction with other material handling systems such as conveyors or storage systems to facilitate organization of items being conveyed and/or handled.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to a manipulator comprising a shaft driven by a first motor, a rotatable unit, a linear slider, and a gripper. The rotatable unit is coupled to the shaft, wherein the rotatable unit rotates with rotation of the shaft. The linear slider disposed on a first surface of the rotatable unit configured to slide from an initial position proximate to an outer edge of the rotatable unit to intermediate positions and to a final position proximate to a center of the rotatable unit. The gripper coupled to the linear slider to facilitate movement of the gripper along a first plane defined by the first surface of the rotatable unit.

Various example embodiments described herein, relates to the gripper which includes a pneumatic cylinder to facilitate movement of the gripper along a second plane orthogonal to the first plane.

Various example embodiments described herein, relates to the gripper which is one of a suction gripper, claw gripper, or magnetic gripper.

Various example embodiments described herein, relates to the linear slider which is actuated by a second motor mounted on a second surface of the rotatable unit.

Various example embodiments described herein, relates to the rotatable unit with the first surface and the second surface, the surfaces being on opposite different sides of the rotatable unit. The rotatable unit may be a circular disc Various example embodiments described herein, relates to the linear slider which includes a movable carriage to facilitate movement of the gripper along the first plane.

Various example embodiments described herein, relates to the rotatable unit which is mounted on one of a ceiling or a floor using the shaft.

Various example embodiments described herein, relates to the rotatable unit in which the shaft is coupled with an aperture provided on the center of the rotatable unit.

Various example embodiments described herein, relates to the linear slider with profiled rail guides with integrated rack & pinion assemblies operated by a second motor.

Various example embodiments described herein, relates to a robotic system which includes a manipulator to perform one of a picking operation and placing operation. The manipulator includes a rotatable unit, a linear slider, and a gripper attached to the rotatable unit via the linear slider, wherein the gripper rotates along with rotation of the rotatable unit, and wherein the gripper is configured to move along a first plane defined by a first surface of the rotatable unit in response to movement of a movable carriage of the linear slider and a second plane orthogonal to the first plane.

Various example embodiments described herein, relates to the gripper which is configured to move in the second plane based on actuation of a pneumatic cylinder.

Various example embodiments described herein, relates to the gripper which is actuated simultaneously with the rotation of the rotatable unit to perform one of the picking operation or the placing operation. The rotatable unit is one of a circular disc, a dodecagonal disc, a pentagonal disc, a hexagonal disc or any disc shaped in a manner to receive the gripper.

Various example embodiments described herein, relates to the robotic system in which the first gripper performing a picking operation, a second gripper performs a placing operation.

Various example embodiments described herein, relates to the rotatable unit which is suspended from a ceiling mounted shaft attached to a second surface of the rotatable unit.

Various example embodiments described herein, relates to the rotatable unit which is rotated by a motor coupled to the ceiling mounted shaft.

Various example embodiments described herein, relates to the linear slider which is actuated by at least one of a servo motor or a stepper motor attached to the rotatable unit.

Various example embodiments described herein, relates to a method for performing a picking operation and placing operation. The method includes the steps of rotating a rotatable unit attached with plurality of grippers over a first conveyor and a second conveyor and sliding a gripper of the plurality of grippers from a first position to a second position, wherein the second position has a different distance to a center of the rotatable unit than the first position. Further, the method includes actuating the gripper of the plurality of grippers along a second plane orthogonal to a first plane defined by a surface of the rotatable unit, wherein actuating the gripper comprises retracting the gripper closer to the rotatable unit or extending the gripper away from the rotatable unit, wherein the sliding and the actuating the gripper repositions the gripper to pick an article from the first conveyor and place the article on the second conveyor.

Various example embodiments described herein, relates to the method for performing a picking operation and placing operation in which sliding and actuating multiple grippers of the plurality of grippers concurrently during the picking and placing operation, and wherein the actuating and sliding is based on a dimension of the article.

Various example embodiments described herein, relates to the method for performing a picking operation and placing operation in which rotating includes incrementally rotating the rotatable unit between a plurality of rotational positions to perform the picking and placing operation.

Various example embodiments described herein, relates to the method for performing a picking operation and placing operation in which sliding the gripper includes sliding a movable carriage on a linear slider attached to the rotatable unit, wherein the movable carriage comprises the gripper.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
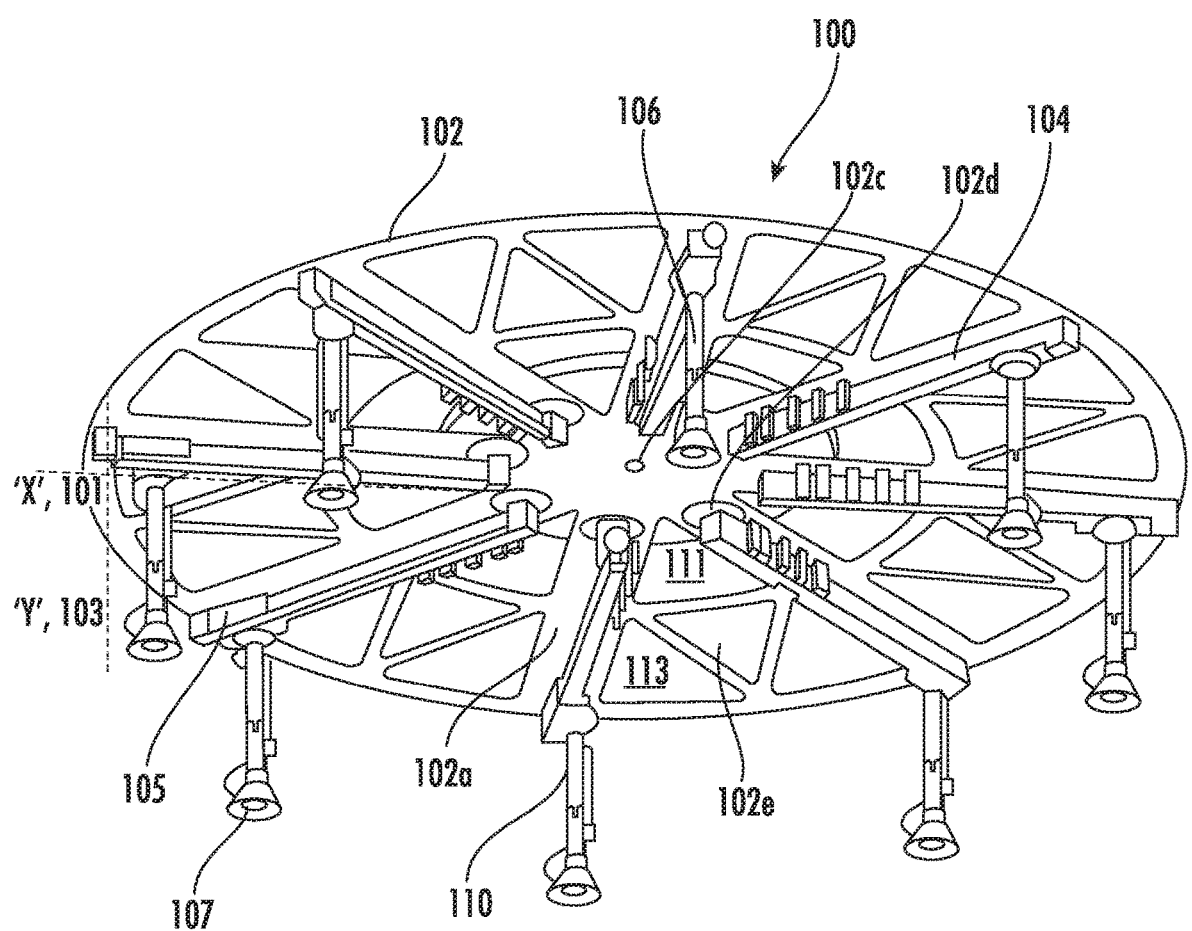
FIG. 1 illustrates a perspective view of the robotic manipulator, in accordance with an embodiment of the present invention.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As used herein, the terms "manipulator," "end of arm tool", and similar terms may be used interchangeably to refer to a manipulator of the robotic systems within a material handling system in accordance with embodiments of the present disclosure. Thus, use of any such terms should not be taken to limit the spirit and scope of embodiments of the present disclosure.

As used herein, the terms "rotatable unit" may refer to a circular disc, a dodecagonal disc, a pentagonal disc, a hexagonal disc or any disc shaped in a manner to receive a gripper of the manipulator. Thus, use of the term "rotatable unit" should not be taken to limit the spirit and scope of embodiments of the present disclosure.

In material handling environment, such as, but not limited to, distribution centers, warehouses, inventories, or shipping centers, various equipment such as, robotic arms, item manipulators, conveyor overhead units, and/or the like are used for performing various operations. For instance, these equipments are used for manipulating items located in the material handling environment and/or in transit on some conveyors or truck trailers. Manipulation of the items referred herein, may involve performing operations such as, but not limited to, picking, re-orienting, placing, sorting, stacking, un-stacking, lifting, repositioning, or relocating the items.

Generally, material handling systems may include robotic tools installed in the material handling environment, which are configured to perform the manipulation of items. These robotic tools are usually designed to pick and place an item. For instance, some robotic tools are designed to pick flexible shaped items like, envelopes, packages. Similarly, some robotic tools are designed to pick items having rigid shape like, containers, totes, cartons etc.

When manipulating these items, in some cases, a challenge exists when manipulating the items within a desired time frame and speed. For example, during an induction operation, time and speed of inducting the items into the induction or sortation conveyor plays a crucial role in determining a throughput of the sortation conveyor. A manual induction to the sortation conveyor may be a time-consuming process. Alternatively, robotic tools, such as a six-degree of freedom (6-DOF) robots may be used for the induction operation, however, the speed of inducting the items is greatly reduced due to each picking of the items by the 6-DOF robots. In such instances, multiple 6-DOF robots may be installed for speedy induction of the items, however, employing multiple robots may incur heavy cost and maintenance. Therefore, a need exists to manipulate the items at optimum speed and at low cost and maintenance.

Various example embodiments described herein relates to a manipulator which includes a shaft, rotatable unit, grippers and linear sliders. The rotatable unit is coupled to the shaft driven by a motor. The rotatable unit rotates with rotation of the shaft. The linear sliders are disposed on a first surface of the rotatable unit and configured to slide from an initial position proximate to an outer edge of the rotatable unit to intermediate positions and to a final position proximate to a center of the rotatable unit. The grippers are coupled to the linear sliders to facilitate movement of the grippers along a first plane defined by the first surface of the rotatable unit and a second plane orthogonal to the first plane. The grippers, rotatable unit and the linear sliders facilitate in manipulating the item.

According to an embodiment, each gripper positioned in the rotatable unit may handle one item to perform either a picking operation or a placing operation.

According to an embodiment, a set of grippers positioned in the rotatable unit may collectively handle one item to perform either a picking operation or a placing operation.

According to an embodiment, when a first set of grippers perform the picking operation, a second set of grippers perform the placing operation.

According to an embodiment, the grippers rotate along with rotation of the rotatable unit. Each gripper is actuated, by the linear slider, to move along a horizontal axis on the first surface of the rotatable unit. Further, each gripper is actuated, by a pneumatic or hydraulic cylinder, to move along a vertical axis by extending and retracting the gripper to perform either the picking operation or the placing operation.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Throughout this specification, the term 'circular disc' of the manipulator should be taken as an example of the rotating unit attached to the manipulator. However, one skilled in the art would realize that the 'circular disc' can be replaced with any disc of alternate shapes capable of being mounted to the manipulator.

FIG. 1 illustrates a perspective view of the robotic manipulator 100, in accordance with an embodiment of the present invention. In the embodiment shown in FIG. 1, the robotic manipulator 100 includes a rotatable unit 102, linear sliders 104 and grippers 106. According to an embodiment, the grippers 106 and the linear sliders 104 rotate along with the rotation of the rotatable unit 102. The rotatable unit 102, for example, is a circular disc. According to an embodiment, each gripper 106 is individually actuated to move in a horizontal axis 'X' and a vertical axis 'Y' during the rotation of the circular disc 102 to perform a picking and a placing operation.

Figure 2:
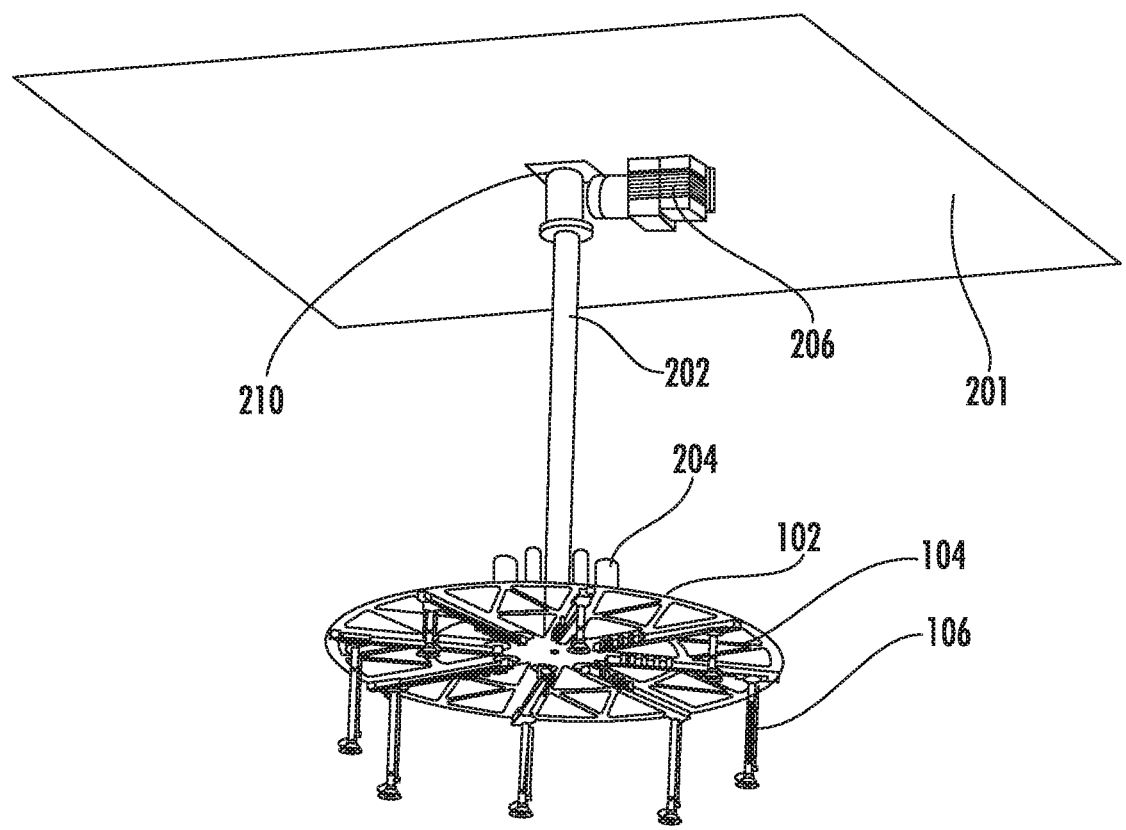
FIG. 2 illustrates a perspective view of the robotic manipulator suspended from a ceiling, in accordance with an embodiment of the present invention.

According to an embodiment, the circular disc 102 includes a first surface 102a and a second surface 102b. The first surface 102a and the second surface (not shown) are on opposite different sides of the circular disc 102. In some examples, when the robotic manipulator 100 is mounted to the ceiling 201 (as shown in FIG. 2), the first surface 102a receives the linear sliders 104 and the grippers 106, and the second surface receives a shaft 202 (as shown in FIG. 2). In some examples, when the robotic manipulator 100 is mounted to the floor (not shown), the second surface receives the linear sliders 104 and the grippers 106, and the first surface 102a receives the shaft 202. According to an embodiment, the circular disc 102 may include a center hole 102c and plurality of mounting holes 102d. The plurality of mounting holes 102d may be positioned proximate to the center hole 102c and equidistant from each other. The mounting holes 102d may be provided for attaching the linear sliders 104 with the circular disc 102. According to an embodiment, the circular disc 102 may include one or more cut-outs 102e provided along substantially throughout a diameter of the circular disc 102. The one or more cut-outs 102e may extend radially with respect to the mounting holes 102d. In some examples, the cut-outs 102e may be provided to reduce a weight of the circular disc 102.

According to an embodiment, the linear sliders 104 are attached to the circular disc 102 using the mounting holes 102d. For example, one end of each linear slider 104 is attached to a corresponding mounting hole on the circular disc 102. In some examples, the mounting holes 102d may be through holes or bolt holes to which the linear sliders 104 are mounted using detachable fastening elements such as nuts, bolts and washers. In this regard, the linear sliders 104 may be detachable attached to the circular disc 102. According to an embodiment, the circular disc 102 may include two sets of mounting holes 102d, 102f—a first set of mounting holes 102d and a second set of mounting holes 102f. The first set of mounting holes 102d may be positioned on an inner circumference 111 of the circular disc 102 and the second set of mounting holes 102f may be positioned on an outer circumference 113 of the circular disc 102. The first set of mounting holes 102d may be in proximity with the center hole 102c of the circular disc 102 and the second set of mounting holes 102f may be positioned away from the center hole 102c on an outer edge 114 of the circular disc 102. The first set of mounting holes 102d may receive one end of the linear sliders 104 and the second set of mounting holes 102f may receive the other end of the linear sliders 104. In this regard, distance between the first set of mounting holes 102d and the second set of mounting holes 102f is substantially equal to a length of each linear slider 104. According to another embodiment, the linear slider 104 may be welded to the circular disc 102 without the use of any fasteners.

Figure 4:
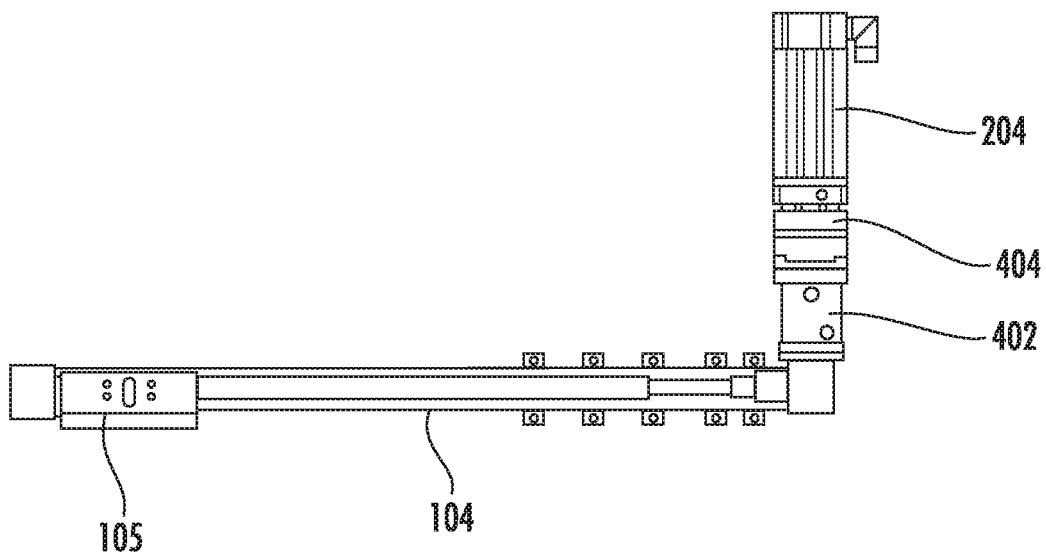
FIG. 4 illustrates a side view of the linear slider of the robotic manipulator, in accordance with an embodiment of the present invention.
Figure 6:
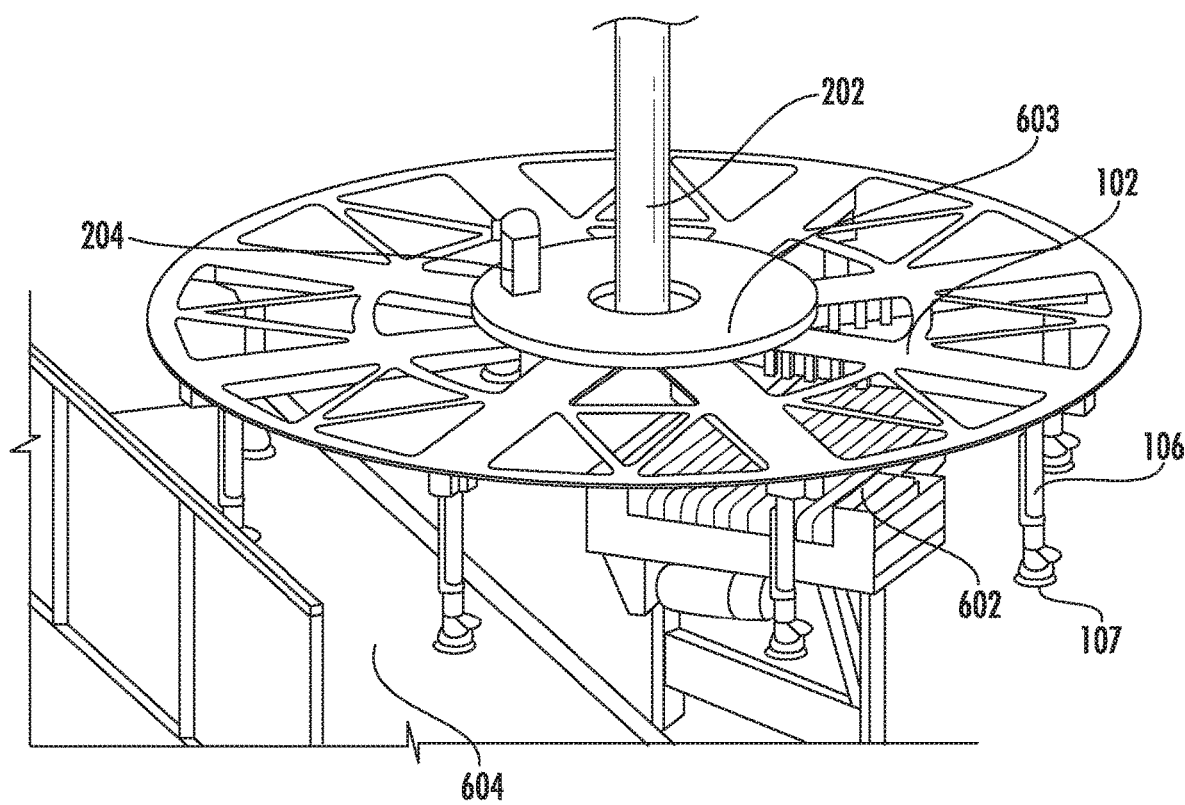
FIG. 6 illustrates a perspective view of an example embodiment of the robotic manipulator used in conjunction with conveyors, in accordance with an embodiment of the present invention.

According to an embodiment, each linear slider 104 may include a movable carriage 105 (as clearly depicted in FIG. 4). The movable carriage 105 facilitates movement of the gripper 106 on the linear slider 104. In some examples, the movable carriage 105 may be conveyed on profiled rail guides with integrated rack & pinion assemblies driven by one or more motors 204 (as shown in FIG. 2). The movable carriage 105 may include a pair of wheels (not shown) that engage the profiled rail guides to facilitate movement of the movable carriage 105. According to an embodiment, the movable carriages 105 mounted on the linear sliders 104 are driven by a single motor 204 (as shown in FIG. 6). In this regard, the movable carriages 105 slide in unison from an outer end of the circular disc 102 to an inner end of the circular disc 102 proximate to the center hole 102c. In some examples, each movable carriage 105 is driven by a motor (as shown in FIG. 2). The motor and the linear slider 104 are coupled using a coupler 402 as shown in FIG. 4. A side view of the linear slider 104 of the robotic manipulator 100 is shown in FIG. 4. The linear slider 104 includes a gearbox assembly 404 to adjust the speed of the movable carriage 105. In some examples, the motor 204 of the linear slider 104 may be a servo motor embedded with an encoder. The encoders, for example, may be magnetic encoders, mechanical encodes, resistive encoders or optical encoders. The servo motor 204, for example, may be AC or DC motors, brushed or brushless motors. In some examples, a stepper motor 204 embedded with an encoder may also be used. Each linear slider 104 may include one dedicated motor 204 for precise positioning and speed control of the movable carriage 105 on the linear slider 104.

Figure 5:
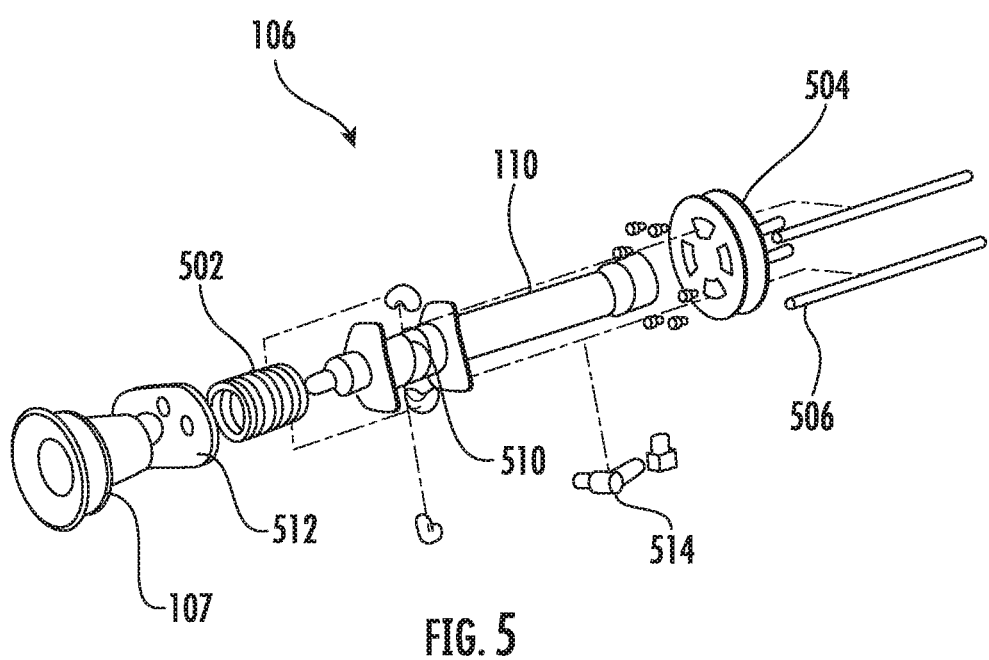
FIG. 5 illustrates an example gripper of the robotic manipulator, in accordance with an embodiment of the present invention.

According to an embodiment, the grippers 106 may be attached to the movable carriages 105. The movable carriages 105 imparts forward and backward linear movements to the grippers 106. The grippers 106, for example, may be suction grippers 106, claw grippers 106, or magnetic grippers 106. According to an embodiment, the grippers 106 may be detachably coupled to the movable carriages 105. In some examples, the movable carriages 105 may include either a permanent magnet or electromagnet which can hold the grippers 106 by means of a magnetic force. In some examples, the movable carriages 105 may include provisions to mate with the grippers 106 via an interference or friction fit. In this regard, the grippers 106 may be easily replaced or removed. For example, a claw gripper 106 may be replaced with a suction gripper 106 at ease without use of any complex tools based on type of application the robotic manipulator 100 may be used. In FIG. 1, the suction grippers 106 are mounted to the movable carriages 105 of the linear sliders 104. Each of the suction grippers 106 may be individually moved in both horizontal axis 'X' and vertical axis 'Y'. The horizontal axis 'X' may be on a first plane 101 defined by the first surface 102a of the circular disc 102 and the vertical axis 'Y' may be on the second plane 103 orthogonal to the first plane 101. For example, the suction grippers 106 may be moved in the horizontal axis 'X' or the first plane 101 by the sliding movement of the movable carriages 105 along the linear sliders 104. The movable carriages 105 may slide from the outer edge 114 of the circular disc 102 towards the center hole 102c of the circular disc 102 and vice-versa. Further, the suction grippers 106 may be moved in the vertical axis 'Y' or the second plane 103 using pneumatic cylinder 110 as seen in FIG. 5. In some examples, the suction grippers 106 may use hydraulic cylinders for movement along the vertical axis 'Y'. For example, the suction grippers 106 may be extended or retracted using a pneumatic cylinder 110. During a picking operation, the suction grippers 106 may be extended away from the circular disc 102 and during a placing operation, the suction grippers 106 may be retracted towards the circular disc 102. Each of the suction gripper 106 as shown in FIG. 1 includes a suction cup 107 to manipulate articles. In the embodiment shown in FIG. 1, one suction cup 107 is coupled to each suction gripper 106, however, conceivable are other embodiments in which multiple suction cups 107 are coupled to each suction gripper 106.

FIG. 2 illustrates a perspective view of the robotic manipulator 100 suspended from a ceiling 201, in accordance with an embodiment of the present invention. In FIG. 2, an example embodiment of the robotic manipulator 100 suspended from the ceiling 201 is shown, however, in an alternate example embodiment the robotic manipulator 100 may be fixed to the floor. In the example embodiment shown in FIG. 2, the robotic manipulator 100 includes a shaft 202 coupled to the circular disc 102. The circular disc 102 is fitted with the linear sliders 104 and grippers 106. According to an embodiment, the circular disc 102 rotates along with the rotation of the shaft 202.

According to an embodiment, the shaft 202 is mounted to the ceiling 201 and is coupled to a first motor 206. The shaft 202 may be driven by the first motor 206. The first motor 206 may be a stepper motor or a servo motor. In some examples, when articles are to be picked from and placed on more than one conveyor, a stepper motor may be used to rotate the shaft 202 such that the robotic manipulator 100 may be moved incrementally from one conveyor to another conveyor. In the FIG. 2, the shaft 202 and the first motor 206 are both mounted on the ceiling 201. According to an embodiment, when the shaft 202 is mounted to the ceiling 201, a length of the shaft 202 may be dynamically adjusted based on the type of application the robotic manipulator 100 may be used. For example, multiple shaft 202 portions (not shown) of varying lengths may be nested within each other in a sliding arrangement to form the shaft 202. The desired number of shaft 202 portions may be extended out in accordance with the type of application. Each of the shaft 202 may also include a stopper member (not shown) to lock the shaft 202 portion at a desired length and to stop the shaft 202 position from further extending or sliding during operation of the robotic manipulator 100. According to another embodiment, shaft 202 of different lengths may be manually replaced based on the type of application. For example, when the robotic manipulator 100 is used for manipulating articles on floor level conveyors, the shaft 202 may be of higher length than when used for manipulating articles at a high bay storage level.

According to another embodiment, the shaft 202 may be mounted to the floor along with the first motor. As previously discussed, the shaft 202 mounted to the floor may be dynamically adjusted or manually replaced in accordance with the type of application the robotic manipulator 100 may be used. According to an embodiment, the shaft 202 is mounted to the floor or ceiling 201 using fasteners and attachment plate 210. For example, the attachment plate 210 be attached to the ceiling 201 and may include hollow openings with bolt holes (not shown) through which the shaft 202 is inserted and tightened using fasteners such as nuts, screws, bolts and washers. According to another embodiment, the shaft 202 is detachably mounted to ceiling 201 or the floor using mounting fixture and dowel pins (not shown). For example, the mounting fixture may include provisions to mate with one end of the shaft 202 by means of an interference or frictional fit and a dowel pin may be inserted through apertures of the shaft 202 and the mounting fixture which are overlapped when a portion of the shaft 202 is inside the mounting fixture. In this regard, the dowel pin may be easily removed and the portion of the shaft 202 contacting the mounting fixture may be forcibly pulled out of contact from the mounting fixture when the shaft 202 needs to be replaced.

According to an embodiment, other end of shaft 202 opposite to the end attached to the attachment plate 210 may be inserted into the center hole 102c of the circular disc 102 by means of an interference or a friction fit. In some examples, the circular disc 102 may include multiples holes positioned around the circumference of the center hole 102c (i.e., the hole at a center of the circular disc 102) with a radius smaller than the radius of the center hole 102c. The shaft 202 may be attached to the circular disc 102 using the multiple holes and fastened using fasteners, such as nuts and bolts. In this regard, the shaft 202 and the circular disc 102 are coupled to each other substantially at a center of the circular disc 102 such that the rotation of the shaft 202 imparts rotation to the circular disc 102. The shaft 202 is coupled to the center of the circular disc 102 to evenly distribute weight on the circular disc 102 along a radial axis away from the center of the circular disc 102.

According to an embodiment, the circular disc 102 may be rotated incrementally in steps using the first motor coupled to the shaft 202. In some examples, when articles are to be picked from and placed on more than one conveyor, the circular disc 102 may be incrementally rotated from one conveyor to another conveyor to perform the picking and placing operation. According to another embodiment, the circular disc 102 may be rotated from a picking position to a placing position and vice-versa using the first motor coupled to the shaft 202. In some examples, when articles are to be picked from one conveyor and placed on another conveyor, the circular disc 102 may be rotated from the picking position to the placing position and vice-versa to perform the picking and placing operation.

According to an embodiment, the linear slider 104 is disposed on the first surface 102a of the circular disc 102 configured to slide from an initial position proximate to an outer edge 114 of the circular disc 102 to intermediate positions and to a final position proximate to the center of the circular disc 102. The linear slider 104 includes the movable carriage 105 to facilitate movement of the gripper 106 along the first plane 101. The linear slider 104 includes profiled rail guides with integrated rack & pinion assemblies operated by a second motor 204 mounted on a second surface 102b of the circular disc 102. The first surface 102a and the second surface 102b are on opposite different sides of the circular disc 102. The second motor 204 may be a servo motor or a stepper motor. In the FIG. 2, it is shown that each linear slider 104 is coupled to one second motor 204 to impart a sliding motion to each movable carriage 105 independently. In this regard, the movable carriages 105 may be independently positioned at the initial position, the intermediate positions or the final position. In some examples, the second motor 204 coupled to the linear slider 104 may be operated using a central controller (not shown) to adjust the speed or position of each of the movable carriage 105.

According to an embodiment, the gripper 106 is coupled to the linear slider 104 to facilitate movement of the gripper 106 along the first plane 101 defined by the first surface 102a of the circular disc 102. The movable carriage 105 of the linear slider 104 facilitates movement of the gripper 106 along the first plane 101. The gripper 106 includes a pneumatic cylinder 110 to facilitate movement of the gripper 106 along the second plane 103 orthogonal to the first plane 101. The pneumatic cylinder 110 facilitates retracting the gripper 106 closer to the circular disc 102 or extending the gripper 106 away from the circular disc 102 to perform the picking and placing operation. According to an embodiment, a first gripper may perform a picking operation simultaneously when a second gripper performs a placing operation. In some examples, a set of grippers 106 may be actuated to reposition itself for handling wide variety of articles. According to an embodiment, repositioning includes moving the gripper 106 in both the horizontal axis 'X' and the vertical axis 'Y' along the first plane 101 and the second plane 103 respectively. In this regard, dimensions of the article may be considered for repositioning the set of grippers 106. For example, if the article is a carton, then a set of grippers 106 may be assigned for handling the carton for the picking and placing operation on the carton. Based on the dimension of the carton, the set of grippers 106 may be repositioned from their initial positions to intermediate positions on the corresponding linear sliders 104 to handle the carton. The dimensions, for example, includes length, width, height and weight of the carton. In another example, the article may be a polybag, then one gripper 106 from the set of grippers 106 may be assigned for handling the polybag and the other grippers 106 from the set of grippers 106 may be assigned to handle the carton. The gripper 106 handling the polybag may be repositioned along the vertical axis 'Y' by extending and retracting the gripper 106 using the pneumatic cylinder 110. The gripper 106 is repositioned along the vertical axis 'Y' as there exists a height differential between the polybag and the carton. In this regard, the robotic manipulator 100 may be used for handling mixed flow of articles. In some examples, the gripper 106 may be repositioned along the horizontal axis 'X' when the article is off-centered from its original position on the conveyor. The linear slider 104 may slide the gripper 106 to various positions to handle the off-centered article. In this regard, the gripper 106 may be repositioned based on the position of the article to be handled by the robotic manipulator 100. In some examples, when the gripper 106 picks an article from a first conveyor 602 of first height from the floor level and places the article on a second conveyor 604 of second height from the floor level, the gripper 106 may be repositioned (i.e., extended or retracted) using pneumatic or hydraulic cylinders along the vertical axis 'Y' to compensate for the height differential between the first conveyor 602 and the second conveyor 604. In this regard, the grippers 106 may also be repositioned based on the differential height between the conveyors.

In an embodiment, instead of rotating, the circular disc 102 can move linearly or in another movement pattern with respect to the ceiling mounted shaft 202. In this embodiment, the disc 102 can slide or pivot with respect to the shaft 202.

Figure 3:
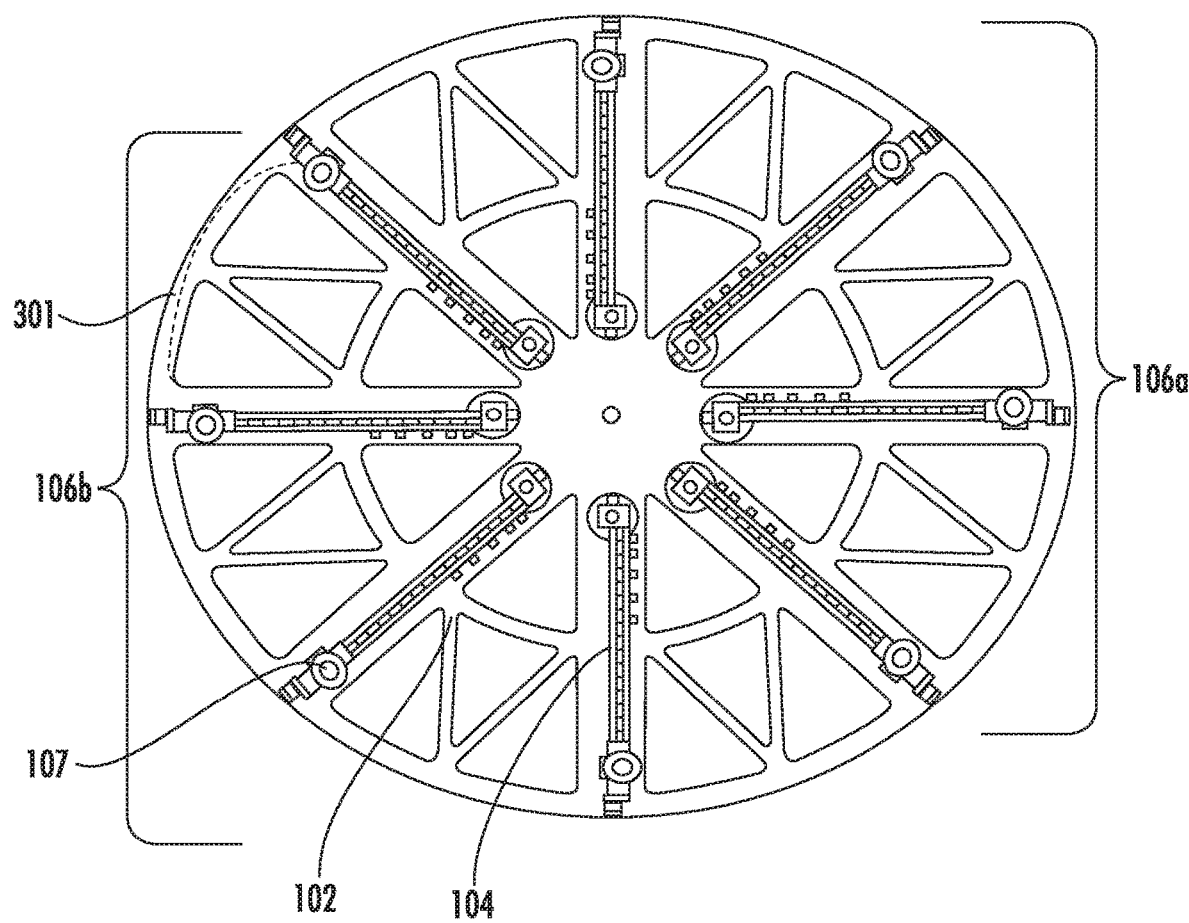
FIG. 3 illustrates a bottom view of the robotic manipulator, in accordance with an embodiment of the present invention.

FIG. 3 illustrates a bottom view of the robotic manipulator 100, in accordance with an embodiment of the present invention. The robotic manipulator 100 includes at least one gripper 106 coupled to a circular disc 102 to manipulate the articles. The at least one gripper 106 can slide on a linear slider 104 along a first plane 101 and can extend along a second plane 103 orthogonal to the first plane 101. In FIG. 3, exemplary robotic manipulator 100 with 8 grippers 106 is shown. The grippers 106 are positioned equidistant from each other in a radial direction throughout the diameter of the circular disc 102. The grippers 106 are shown positioned at an initial position proximate to the outer edge 114 of the circular disc 102. The grippers 106 may be moved in unison or independently from the initial position to intermediate positions and the final position proximate to the center of the circular disc 102. The linear sliders 104 extend from the outer edge 114 of the circular disc 102 to the center of the circular disc 102 to facilitate sliding of the grippers 106 from the initial position to the final position. In FIG. 3, the linear sliders 104 are equally spaced radially such that multiple arcs 301 are formed on the circumference of the circular disc 102 in between the linear sliders 104. For example, an arc 301 may be formed in between two linear sliders 104 when linear sliders 104 are radially arranged on the circular disc 102. In some examples, the linear sliders 104 may be positioned in a such a manner to form right angles with each other. In such a scenario, a total of 8 grippers 106 may be positioned by mounting a pair of grippers 106 together along either side of normal lines of the circular disc 102.

The grippers 106 shown in FIG. 3 are suction grippers 106 having suction cup 107 to manipulate the articles. In some examples, the grippers 106 may include claw type grippers 106, magnetic grippers 106, prong type grippers 106 and their like. For example, in FIG. 3, it is feasible to have 4 grippers 106 as suction type grippers 106 and other 4 grippers 106 as claw type grippers 106. The suction grippers 106 may handle a first type of articles, for example, boxes and the claw type grippers 106 may handle a second type of articles, for example, polybags. In this regard, multiple types of gripper 106 may be mounted to the robotic manipulator 100 at any given instance of time to manipulate wide variety of articles simultaneously.

According to an embodiment, grippers 106 can be activated selectively based on the type and weight of the articles to be handled by the robotic manipulator 100. For example, if the robotic manipulator 100 handles a large carton (i.e., a carton of heavy weight), then 4 of 8 grippers 106 of FIG. 3 may be activated and repositioned to handle the large carton. For example, if the robotic manipulator 100 handles a small carton, then 2 of 8 grippers 106 of FIG. 3 may be activated and repositioned to handle the small carton. In some examples, the articles may be only polybags and in such cases each gripper 106 will be assigned to handle one polybag. In this regard, dynamic assignment of grippers 106 based on type and weight of articles may be achieved.

According to an embodiment, grippers 106 can be activated selectively based on the length of the articles. In such scenarios, one linear slider 104 may include more than one movable carriage 105, each having a gripper 106 capable of being repositioned in both the horizontal and vertical axis 'Y'. For example, if the robotic manipulator 100 handles a lengthy carton (i.e., a carton of higher length than a standard carton), then the grippers 106 will move on the linear slider 104 to appropriate positions to handle the lengthy carton. One of the gripper 106 may move by means of a first movable carriage to an initial position and the other of the gripper 106 may move by means of a second movable carriage to an intermediate position in-between the initial and final position. The distance between the grippers 106 (i.e., the distance between first movable carriage 105 and the second movable carriage) is substantially equal to the length of the lengthy carton. In some examples, two or more linear sliders 104 with each having at least two grippers 106 may be used to handle the lengthy cartons. In this regard, dynamic assignment of grippers 106 based on length of articles may be achieved.

According to an embodiment, grippers 106 can be activated selectively based on a flow of articles on conveyors. For example, when an infeed conveyor senses a high volume of articles during peak hours in a material handling environment, all the grippers 106 may be operated to handle the articles and when a low volume of articles is sensed, only a few of the grippers 106 may be operational. In the example shown in FIG. 3, all 8 grippers 106 may be used when there is high flow of articles and 4 of 8 grippers 106 may be used when there is low or medium flow of articles.

According to an embodiment, the grippers 106 may be operated as per operational cycles. For example, during a first operational cycle, a first set of 4 grippers 106a may be used for a picking operation and the second set of four grippers 106b may be used for a placing operation. In a second operation cycle, the second set of four grippers 106b may be used for picking operation and the first set of four grippers 106a may be used for placing operation. In this regard, the robotic manipulator 100 may be used for performing simultaneous picking and placing operation.

FIG. 5 illustrates an example gripper 106 of the robotic manipulator 100, in accordance with an embodiment of the present invention. As shown in FIG. 5, the gripper 106 may include a pneumatic cylinder 110, compliance spring 502, suction cup 107, mounting plates 504 and anti-rotation guide rods 506. The suction cup 107 is coupled to the pneumatic cylinder 110 via the compression spring at a first end of the gripper 106. The compliance spring 502 is connected to the pneumatic cylinder 110 by means of a first coupler 510. The mounting plates 504 are connected to the pneumatic cylinder 110 at a second end of the gripper 106. When the gripper 106 is attached to the linear slider 104, the second end being proximal to the linear slider 104 and the first being distal to the linear slider 104. The anti-rotation guide rods 506 are positioned in between the mounting plates 504 and the compliance spring 502. The suction cup 107 may be coupled to the compliance spring 502 by a second coupler 512. The second coupler 512 may be in the form of coupling plate in which a vacuum switch 514 or any sensors may be fitted. The sensors, for example, may be laser range finder sensors configured to identify (e.g., periodically or continuously over a period of time), articles positioned on a conveyor and to determine a distance at which the articles are positioned relative to the suction cup 107. For example, in some embodiments, a laser range finder may determine the distance between a top surface of the article and the first end of the gripper 106. Based on the determined distance, the central controller may cause the robotic manipulator 100 to position the gripper 106 in different operating positions. According to an embodiment, the vacuum switch 514 may be provided to detect vacuum supplied to the suction cup 107. Output from a vacuum generator may be coupled through the vacuum switch 514 to the suction cup 107. Whenever vacuum is applied to the suction cup 107, the vacuum switch 514 will output a signal when a suction is made between the suction cup 107 and the articles. The output from the vacuum switch 514 is utilized by the central controller to rotate the circular disc 102 along with the articles picked by the grippers 106. In some examples, the pneumatic cylinder 110 may include a cylinder piston which is actuated to move the gripper 106 along the vertical axis 'Y' to pick or place the articles. For example, the sensor (as discussed previously) may sense the presence of an article and activate an air supply to the pneumatic cylinder 110 to extend the cylinder piston and the suction cup 107 from its initial position (i.e., retracted position) to a picking position (i.e., extended position). Although the pneumatic cylinder 110 is depicted as an exemplary actuator, it is understood that one or more alternative actuators can be substituted, including electronic and mechanical actuation devices as are known in the art. In some examples, any positional misalignments when gripping the articles is compensated by the compliance spring 502. In some examples, any other compressible material may be used as a compliance device which simplifies the construction of the gripper 106. In some examples, the anti-rotation guide rods 506 maintain the gripper 106 position without any rotation during the gripping of the articles. Further, grippers 106 with pneumatic cylinders 110 used in this invention may include those described in U.S. 62/669,093, all of which are herein fully incorporated by reference.

FIG. 6 illustrates a perspective view of an example embodiment of the robotic manipulator 100 used in conjunction with conveyors, in accordance with an embodiment of the present invention. The conveyors include a first conveyor 602 and a second conveyor 604. The first conveyor 602 for example, may be an infeed conveyor or singulation conveyor. The second conveyor 604, for example, may be a singulation conveyor or induction conveyor. In FIG. 6, it is shown that the robotic manipulator 100 is suspended from the ceiling 201 on top of the first conveyor 602 and the second conveyor 604. In some examples, the robotic manipulator 100 may be positioned at a predetermined distance from the first conveyor 602 and the second conveyor 604 considering the type of articles conveyed on the conveyors.

In FIG. 6, it is shown that the robotic manipulator 100 includes a non-rotating circular disc 603 mounted on top of the circular disc 102 and positioned at a predetermined distance away from the circular disc 603. The non-rotating circular disc 103 is provided to mount one or more motors operating the linear sliders 104. In FIG. 6, it is seen that one motor 204 is mounted on top of the non-rotating circular disc 603. The motor drives the linear sliders 104 of the robotic manipulator 100. The motor, for example, may be a servo motor. The motor drives the movable carriages 105 of the linear sliders 104 in unison from an initial position proximate to the outer edge 114 of the circular disc 102 to intermediate positions and to the final position proximate to the center of the circular disc 102.

According to an embodiment, when the robotic manipulator 100 starts to perform a picking operation, the movable carriage 105 along with the gripper 106 is moved to the initial position. In some examples, the central controller may transmit a first command to reposition all the grippers 106 to the initial position. In some examples, when the first conveyor 602 senses the flow of incoming articles, the central controller may transmit the first command to a motor controller of the second motor 204 driving the linear sliders 104. In some examples, the central controller may send a second command to a motor controller of the first motor 206 driving the circular disc 102 to start rotating the circular disc 102 and subsequently may send the first command to the motor controller driving the linear sliders 104 to reposition the grippers 106 on the linear sliders 104 to the initial position.

In some examples, the laser range finder sensor as discussed previously may be used to detect the presence of the articles. In response to detecting the presence of the articles, the air supply to the pneumatic cylinder 110 of the gripper 106 as shown in FIG. 5 may be activated. The suction cup 107 of the gripper 106 is extended by actuation of the pneumatic cylinder 110. When the article is picked by the suction cup 107 using a suction force, the vacuum switch 514 may be activated indicating that the gripper 106 is in contact with the article. When the vacuum switch 514 is activated, the central controller may be signaled that the picking operation from the first conveyor 602 is completed by the gripper 106. Similar picking operation may be executed by each of the grippers 106 mounted on the circular disc 102. In some examples, the picking operation may be performed during the rotation of the circular disc 102.

According to an embodiment, when the robotic manipulator 100 starts to perform a placing operation, the laser range finder sensor on the gripper 106 may be used to detect the presence of the second conveyor 604 and presence of articles on the second conveyor 604. Upon arriving at the second conveyor 604 and detecting no presence of articles on the second conveyor 604, the vacuum supplied to the suction cup 107 of the gripper 106 may be stopped. Thus, the article may be dropped on the second conveyor 604. In some examples, if the sensor detects that the gripper 106 is too close to the second conveyor 604 and there exists a possibility that the suction cup 107 may collide with the second conveyor 604 due to height differential between the first conveyor 602 and the second conveyor 604, then the air supply to the pneumatic cylinder 110 of the gripper 106 as shown in FIG. 5 may be interrupted until the suction cup 107 holding the article clears off the possibility of collision with the second conveyor 604. The air supply may be reinitiated after the suction cup 107 is sufficiently retracted to a distance clearing the possibility of collision with the second conveyor 604. The article is dropped off or placed on the second conveyor 604 when the air supply is reinitiated and the laser range finder detects no presence of articles on the second conveyor 604. The dropping off or placing the articles on the second conveyor 604 may be performed during the rotation of the circular disc 102.

In some examples, when the laser range finder detects the presence of articles on the second conveyor 604, the rotation of the circular disc 102 is temporarily paused until the laser range finder detects no presence of article at a zone on the second conveyor 604 were picked article is to be dropped. When the laser range finder detects no presence of article in the zone, the vacuum to the suction cup 107 is cut off and the article is dropped off on the second conveyor 604 and further the rotation of the circular disc 102 is reinitiated. Similar placing or dropping off operation may be executed by each of the grippers 106 mounted on the circular disc 102. In some examples, the picking operation and the placing operation may be performed simultaneously during the rotation of the circular disc 102. In such scenarios, the central controller may communicate commands to each gripper 106 individually based on a response signal from each gripper 106. In some examples, the first conveyor 602 and the second conveyor 604 may be closely spaced. For example, a distance or gap between the first conveyor 602 and the second conveyor 604 may be minimal due to space constraints. In such scenarios, the central controller may provide a command to the motor controller of the linear slider 104 to slide the gripper 106 from the initial position to intermediate positions suitable for manipulating articles on both the conveyor. In FIG. 6, a single motor 204 is used to control sliding of the grippers 106 on the linear sliders 104 to the intermediate positions. In some examples, a suitable intermediate position may be selected based on an output signal from the sensor mounted on the gripper 106. For example, a suitable intermediate position may be selected when the laser range finder sensor can detect the article on the conveyor within a predefined working range of the laser range finder sensor. In some examples, a proximity sensors may be used in the grippers 106 to identify the proximity of the gripper 106 to the initial position and the final position on the linear slider 104. In some examples, a potentiometer may be used in the grippers 106 to identify a current position of the gripper 106. In this regard, the central controller may use the output signals from these sensors to efficiently manipulate the articles on the conveyors.

Figure 7:
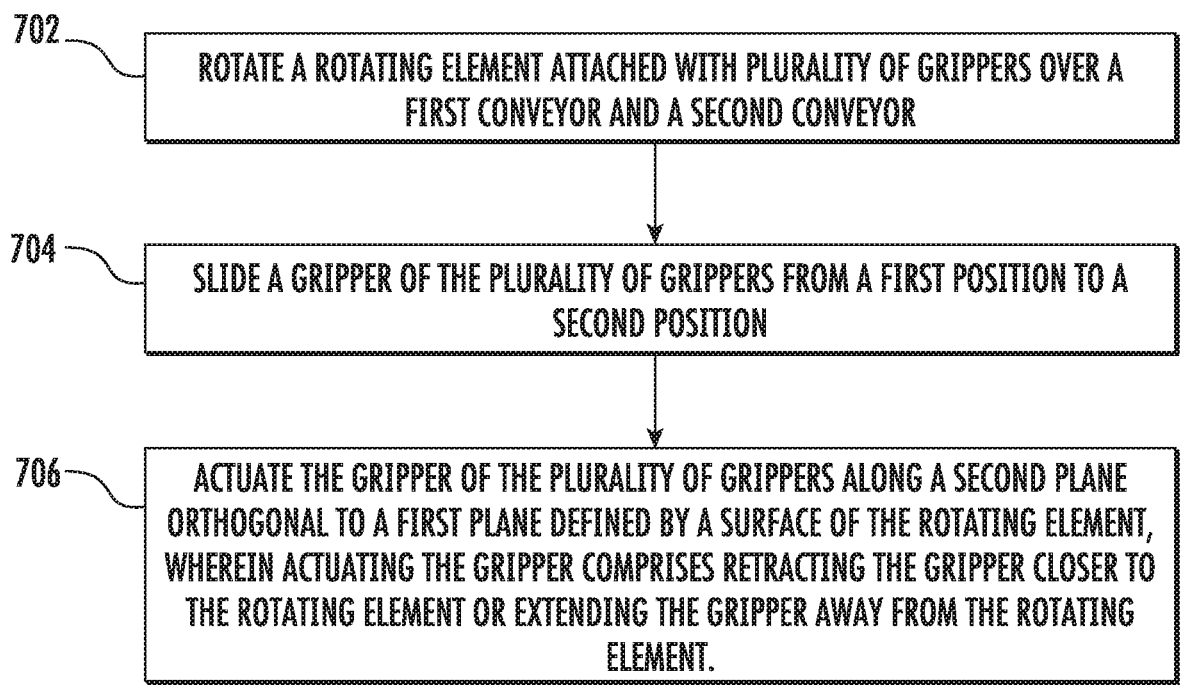
FIG. 7 illustrates a flowchart depicting a method for performing a picking operation and placing operation using the robotic manipulator of FIG. 1.

FIG. 7 illustrates a flowchart depicting a method for performing a picking operation and placing operation using the robotic manipulator of FIG. 1. The robotic manipulator uses the circular disc with the grippers and linear sliders to perform the picking and placing operation. The grippers, the linear sliders and the circular disc are controlled using one or more central controllers. The picking and placing operation, for example, may be performed in conjunction with conveyors. When the picking operation is initiated, at step 702, the circular disc attached with plurality of grippers is rotated over a first conveyor and a second conveyor 604. The first conveyor may be a merger conveyor and a second conveyor may be an induction conveyor. The circular disc is rotated by means of a first motor. The circular disc may be rotated continuously or incrementally by the first motor to a plurality of rotational positions based on number of conveyors involved in the picking and placing operation. When the picking operation is to be performed and the circular disc is rotated, at step 704, a gripper of the plurality of grippers is slid from a first position to a second position, wherein the second position has a different distance to a center of the circular disc than the first position. The grippers are slid using the movable carriage mounted on the linear slider attached to the circular disc. For example, when the first conveyor senses flow of articles, the central controller sends a first command signal to a motor controller of the linear slider to slide the gripper to from the first position to a second position suitable for picking the articles from the first conveyor. The grippers are actuated to slide in a first plane defined by a surface of the circular disc facing the first conveyor. Further, after actuating the grippers to a suitable position for picking, at step 706, the grippers are actuated in a second plane orthogonal to a first plane defined by the surface of the circular disc. The grippers are extended and retracted towards and away from the circular disc during the actuation. For example, during the picking operation, the grippers are extended away from the circular disc towards the first conveyor to pick the articles. For example, the grippers may pick the articles using suction force. For example, during the placing operation, the grippers may be either be extended away or retracted towards the circular disc to place the picked articles on the second conveyor. For example, the grippers may place the articles by releasing the suction force exerted on the articles via the suction cup. In some examples, the central controller may send a second command signal to either retract or extend the gripper during the placing operation. Further, the central controller may also send a third command signal to cut off the vacuum supplied to the suction cup to release the articles. The central controller sends the first, second, and third command signals based on response received from sensors such as, but not limited to, encoders, laser range finders, proximity sensors, potentiometer and the like mounted on the linear sliders and the grippers. Thus, sliding and the actuating the gripper based on commands from the central controller repositions the gripper to pick an article from the first conveyor and place the article on the second conveyor. In some examples, the central controller may send commands to slide and actuate multiple grippers of the plurality of grippers concurrently during the picking and placing operation. In some examples, the central controller may send commands to slide and actuate the gripper based on a dimension of the article. For example, photo eye sensors of the first conveyor may determine a length of the article incoming at the first conveyor and transmit the length to the central controller, which in turn determines the number of grippers to be repositioned to handle the article based on the length. In some examples, the length of the articles may be fed into a memory of the external controller. In some examples, the length of the articles may be dynamically computed based on images from vision sensors positioned on the first conveyor. In this regard, the robotic manipulator comprising the grippers, the linear sliders and the circular disc manipulates the articles based on commands from the central controller.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

In one or more exemplary embodiments, the central controller may include a processor, a memory, and an analog to digital converter (ADC). The central controller may further include a programmable logic controller (PLC). In one embodiment, the ADC can be part of the PLC. In some embodiments, the processor may include other suitable processing elements (not shown), such as a microprocessor, a digital signal processor, a graphics processor, a co-processor, a microcontroller, etc.

The central controller may be configured to execute instructions or code in order to implement methods, processes or operations in various embodiments. In some embodiments of the invention, the central controller may be configured to receive various outputs provided by different sensors that may be associated with a sensor unit coupled to the gripper 106 and the linear slider 104 and communicatively coupled to the external controller.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A manipulator comprising:
a shaft driven by a first motor;
a rotatable unit coupled to the shaft, wherein the rotatable unit rotates with rotation of the shaft;
a linear slider disposed on a first surface of the rotatable unit configured to slide from an initial position proximate to an outer edge of the rotatable unit to intermediate positions and to a final position proximate to a center of the rotatable unit; and
a gripper coupled to the linear slider to facilitate movement of the gripper along a first plane defined by the first surface of the rotatable unit.

2. The manipulator of claim 1, wherein the gripper comprises a pneumatic cylinder to facilitate movement of the gripper along a second plane orthogonal to the first plane.

3. The manipulator of claim 1, wherein the gripper is one of a suction gripper, claw gripper, or magnetic gripper.

4. The manipulator of claim 1, wherein the linear slider is actuated by a second motor mounted on a second surface of the rotatable unit.

5. The manipulator of claim 4, wherein the first surface and the second surface are on opposite different sides of the rotatable unit, and wherein the rotatable unit is a circular disc.

6. The manipulator of claim 1, wherein the linear slider comprises a movable carriage to facilitate movement of the gripper along the first plane.

7. The manipulator of claim 1, wherein the shaft is mounted on one of a ceiling or a floor.

8. The manipulator of claim 1, wherein the shaft is coupled with an aperture provided on the center of the rotatable unit.

9. The manipulator of claim 1, wherein the linear slider comprises profiled rail guides with integrated rack & pinion assemblies operated by a second motor.

10. A robotic system comprising:
a manipulator to perform one of a picking operation and placing operation comprising:
a movable unit;
a linear slider;
a gripper attached to the movable unit via the linear slider, wherein the gripper moves along with movement of the movable unit, and wherein the gripper is configured to move along a first plane defined by a first surface of the movable unit in response to movement of a movable carriage of the linear slider and a second plane orthogonal to the first plane.

11. The robotic system of claim 10, wherein the gripper is configured to move in the second plane based on actuation of a pneumatic cylinder.

12. The robotic system of claim 10, wherein the gripper is actuated simultaneously with the movement of the movable unit to perform one of the picking operation or the placing operation, and wherein the movable unit is one of a circular disc, a dodecagonal disc, a pentagonal disc, a hexagonal disc or any disc shaped in a manner to receive the gripper.

13. The robotic system of claim 10, wherein in response to a first gripper performing a picking operation, a second gripper performs a placing operation.

14. The robotic system of claim 10, wherein the movable unit is suspended from a ceiling mounted shaft attached to a second surface of the movable unit.

15. The robotic system of claim 14, wherein the movable unit is moved with respect to the ceiling mounted shaft.

16. The robotic system of claim 10, wherein the linear slider is actuated by at least one of a servo motor or a stepper motor attached to the movable unit.

17. A method for performing a picking operation and placing operation comprising:
rotating a rotatable unit attached with plurality of grippers over a first conveyor and a second conveyor;
sliding a gripper of the plurality of grippers from a first position to a second position, wherein the second position has a different distance to a center of the rotatable unit than the first position; and
actuating the gripper of the plurality of grippers along a second plane orthogonal to a first plane defined by a surface of the rotatable unit, wherein actuating the gripper comprises retracting the gripper closer to the rotatable unit or extending the gripper away from the rotatable unit, wherein the sliding and the actuating the gripper repositions the gripper to pick an article from the first conveyor and place the article on the second conveyor.

18. The method of claim 17, further comprising sliding and actuating multiple grippers of the plurality of grippers concurrently during the picking and placing operation, and wherein the actuating and sliding is based on a dimension of the article.

19. The method of claim 17, wherein the rotating comprises:
incrementally rotating the rotatable unit between a plurality of rotational positions to perform the picking and placing operation.

20. The method of claim 17, wherein the sliding the gripper comprises:

sliding a movable carriage on a linear slider attached to the rotatable unit, wherein the movable carriage comprises the gripper.

\* \* \* \* \*